(12) United States Patent
Campbell et al.

(10) Patent No.: US 10,142,190 B2
(45) Date of Patent: Nov. 27, 2018

(54) MANAGEMENT PLANE NETWORK AGGREGATION

(71) Applicants: Allied Telesis Holdings Kabushiki Kaisha, Tokyo (JP); ALLIED TELESIS, INC., Bothell, WA (US)

(72) Inventors: Graeme Keith Campbell, Christchurch (NZ); Geoffrey Douglas McCaughan, Rangoria (NZ)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 396 days.

(21) Appl. No.: 14/566,641

(22) Filed: Dec. 10, 2014

(65) Prior Publication Data

US 2016/0173345 A1 Jun. 16, 2016

(51) Int. Cl.
*G06Q 30/06* (2012.01)
*H04L 12/24* (2006.01)

(52) U.S. Cl.
CPC .................................. *H04L 41/32* (2013.01)

(58) Field of Classification Search
None
See application file for complete search history.

(56) References Cited

U.S. PATENT DOCUMENTS

| | | | |
|---|---|---|---|
| 6,856,591 B1 * | 2/2005 | Ma | H04L 41/0631 370/216 |
| 8,331,263 B2 | 12/2012 | Dow | |
| 2003/0131311 A1 | 7/2003 | McNamara | |
| 2004/0184441 A1 | 9/2004 | Wu et al. | |
| 2005/0259595 A1 | 11/2005 | Preguica | |
| 2006/0038688 A1 | 2/2006 | Nakamura | |
| 2006/0265482 A1 | 11/2006 | Trisno et al. | |
| 2007/0110048 A1 * | 5/2007 | Voit | H04L 12/4633 370/389 |
| 2008/0126857 A1 | 5/2008 | Basham | |
| 2009/0041037 A1 | 2/2009 | Yang et al. | |
| 2009/0222543 A1 | 9/2009 | Tannenbaum et al. | |

(Continued)

FOREIGN PATENT DOCUMENTS

| | | |
|---|---|---|
| EP | 0841824 A1 | 5/1998 |
| EP | 2337275 | 6/2001 |

(Continued)

OTHER PUBLICATIONS

Manual for Remote Control, www.teamview.com, Jan. 30, 2011, 84 pages.

*Primary Examiner* — Angela Nguyen
(74) *Attorney, Agent, or Firm* — Brooks Acordia IP Law, PC; Michael Zarrabian

(57) ABSTRACT

Some embodiments provide a system that includes a first network area, a second network area, and a third network area. The first network area includes a first master node and a first set of switches for forwarding network data through the first network area. The first master node is configured to manage the first set of switches. The second network area includes a second master node and a second set of switches for forwarding network data through the second network area. The second master node is configured to manage the second set of switches. The third network area includes a controller configured to manage the first and second sets of switches through the first and second master nodes.

20 Claims, 13 Drawing Sheets

(56) References Cited

U.S. PATENT DOCUMENTS

| | | |
|---|---|---|
| 2010/0121176 A1 | 5/2010 | Fan et al. |
| 2010/0306352 A1 | 12/2010 | Pritikin |
| 2011/0019534 A1 | 1/2011 | Ramakrishnan et al. |
| 2012/0147898 A1* | 6/2012 | Koponen ............ H04L 41/0893 370/422 |
| 2014/0105213 A1* | 4/2014 | A K ........................ H04L 45/74 370/392 |
| 2015/0117458 A1* | 4/2015 | Gurkan ................... H04L 45/72 370/392 |
| 2015/0244617 A1* | 8/2015 | Nakil ................. G06F 9/45558 709/224 |

FOREIGN PATENT DOCUMENTS

| | | |
|---|---|---|
| EP | 2112788 A1 | 10/2009 |
| KR | 2002003888 | 5/2005 |
| WO | 2005053178 | 6/2005 |

* cited by examiner

500

```
┌─────────────────────────────────────────────────┐
│  ESTABLISHING A CONNECTION WITH A LOCAL MASTER  │
│                      510                        │
└─────────────────────────────────────────────────┘
                        │
                        ▼
┌─────────────────────────────────────────────────┐
│  RECEIVING A COMMAND TO MANAGE A SWITCH FROM A USER │
│                      520                        │
└─────────────────────────────────────────────────┘
                        │
                        ▼
┌─────────────────────────────────────────────────┐
│ DIRECTING THE LOCAL MASTER TO MANAGE THE SWITCH BASED │
│                 ON THE COMMAND                  │
│                      530                        │
└─────────────────────────────────────────────────┘
```

```
┌─────────────────────────────────────────────────┐
│   RECEIVING LOCAL MASTER INFORMATION FROM A NODE │
│                      710                         │
└─────────────────────────────────────────────────┘
                        │
                        ▼
┌─────────────────────────────────────────────────┐
│ DISTRIBUTING LOCAL MASTER INFORMATION TO NODES IN SAME │
│                  NETWORK AREA                    │
│                      720                         │
└─────────────────────────────────────────────────┘
                        │
                        ▼
┌─────────────────────────────────────────────────┐
│  GENERATING LAYER 3 ROUTES TO LOCAL MASTER IF LOCAL │
│  MASTER INFORMATION RECEIVED FROM A NODE IN DIFFERENT │
│                  NETWORK AREA                    │
│                      730                         │
└─────────────────────────────────────────────────┘
```

FIG 7

MANAGEMENT PLANE NETWORK AGGREGATION

RELATED APPLICATIONS

This application is related to U.S. application Ser. No. 13/754,441, titled "HIERARCHICAL NETWORK WITH ACTIVE REDUNDANT LINKS", filed on 30 Jan. 2013, which is incorporated herein by reference.

This application is related to U.S. application Ser. No. 14/183,448, titled "AN AUTOMATED COMMAND AND DISCOVERY PROCESS FOR NETWORK COMMUNICATIONS", filed on 18 Feb. 2014, which is incorporated herein by reference.

BACKGROUND

Deploying a large network can often be complex. Furthermore, maintaining, modifying, monitoring a large network may be costly and time-consuming. In some cases, several large networks need to be deployed (e.g., in an enterprise environment), and managing the large networks becomes more costly, time-consuming, and complex as each large network may need to be managed separately while maintaining interoperability with other large networks.

SUMMARY

Accordingly, a need has arisen to manage several management networks through a single "super" management network. For example, a need has arisen to aggregate several management networks and form a single management network through which the several management networks are managed.

In some embodiments, a system includes a first network area, a second network area, and a third network area. The first network area includes a first master node and a first set of switches for forwarding network data through the first network area. The first master node is configured to manage the first set of switches. The second network area includes a second master node and a second set of switches for forwarding network data through the second network area. The second master node is configured to manage the second set of switches. The third network area includes a controller configured to manage the first and second sets of switches through the first and second master nodes.

It is appreciated that each of the first, second, and third network areas is a loop-free broadcast domain. In some embodiments, the first master node, the second master node, and the controller may form a layer 3 network. The first master node may be further configured to communicate through the layer 3 network with the controller but not with the second master node. The second master node may be further configured to communicate through the layer 3 network with the controller but not with the first master node.

The system may further comprise a fourth network area that includes a third master node and a third set of switches for forwarding network data through the fourth network area. The third master node may be configured to manage the third set of switches. The controller may be further configured to manage the third set of switches through the third master node. It is appreciated that the fourth network area is communicatively coupled to the third network area through the first network area.

In some embodiments, the first network area may further include a first gateway node, the second network area may further include a second gateway node, and the third network area may further include a third gateway node. The first and third gateway nodes may be configured to provide a first communication link for the controller and the first master node to communicate across the first and third network areas. The second and third gateway nodes may be configured to provide a second communication link for the controller and the second master node to communicate across the second and third network areas. It is appreciated that the first and second communication links may be configured to allow communication of layer 3 network data but not managed layer 2 network data. It is also appreciated that the first gateway node and the first local master node may be implemented as a single node. It is further appreciated that the third gateway node and the controller may be implemented as a single node.

In some embodiments, a machine-readable storage medium stores machine executable instructions that, if executed by a networking device, cause the networking device to perform a method. The method includes receiving a first command from a user for managing a first switch in a first network area. The method also includes receiving a second command from the user for managing a second switch in a second network area different from the first network area. The method further includes directing a first master node in the first network area to manage the first switch based on the first command. The method also includes directing a second master node in the second network area to manage the second switch based on the second command.

In some embodiments, the method may further include receiving a third command from the user for managing a third switch in a third network area different from the first and second network areas and directing a third master node in the third network area to manage the third switch based on the third command. It is appreciated that each of the first and second network areas may be a loop-free broadcast domain. In some embodiments, directing the first master node may include directing the first master node through a layer 3 network. In some embodiments, directing the second master node may include directing the second master node through the layer 3 network.

In some embodiments, a system includes a first network area, a second network area, and a third network area. The first network area includes a first master node and a first set of switches for forwarding network data through the first network area. The second network area includes a second master node and a second set of switches for forwarding network data through the second network area. The third network area includes a controller node. The first master node and the controller node may be configured to exchange respective node information. The second master node and the controller node may be configured to exchange respective node information. The first master node, the second master node, and the controller node may be further configured to form a network through which the controller node manages the first and second sets of switches through the first and second master nodes.

It is appreciated that the network is a layer 3 network. In some embodiments, the first master node, the second master node, and the controller node may be further configured to generate layer 3 routes based on the exchanged node information. Each of the first master node, the second master node, and the controller node may have a layer 3 network address determined based on its own respective node information. In some embodiments, each of the first master node, the second master node, and the controller node may be further configured to derive the layer 3 network address of another node based on the node information of the another node.

It is appreciated that the node information may be exchanged over physical Ethernet links. It is also appreciated that the node information may be exchanged over tunneled virtual links.

These and various other features and advantages will be apparent from a reading of the following detailed description.

BRIEF DESCRIPTION OF DRAWINGS

The embodiments are illustrated by way of example, and not by way of limitation, in the figures of the accompanying drawings and in which like reference numerals refer to similar elements.

FIG. 5 shows a flow diagram for managing switches in a management network in accordance with some embodiments.

FIG. 7 shows a flow diagram for distributing local master information in accordance with some embodiments.

DETAILED DESCRIPTION

Figure 1:
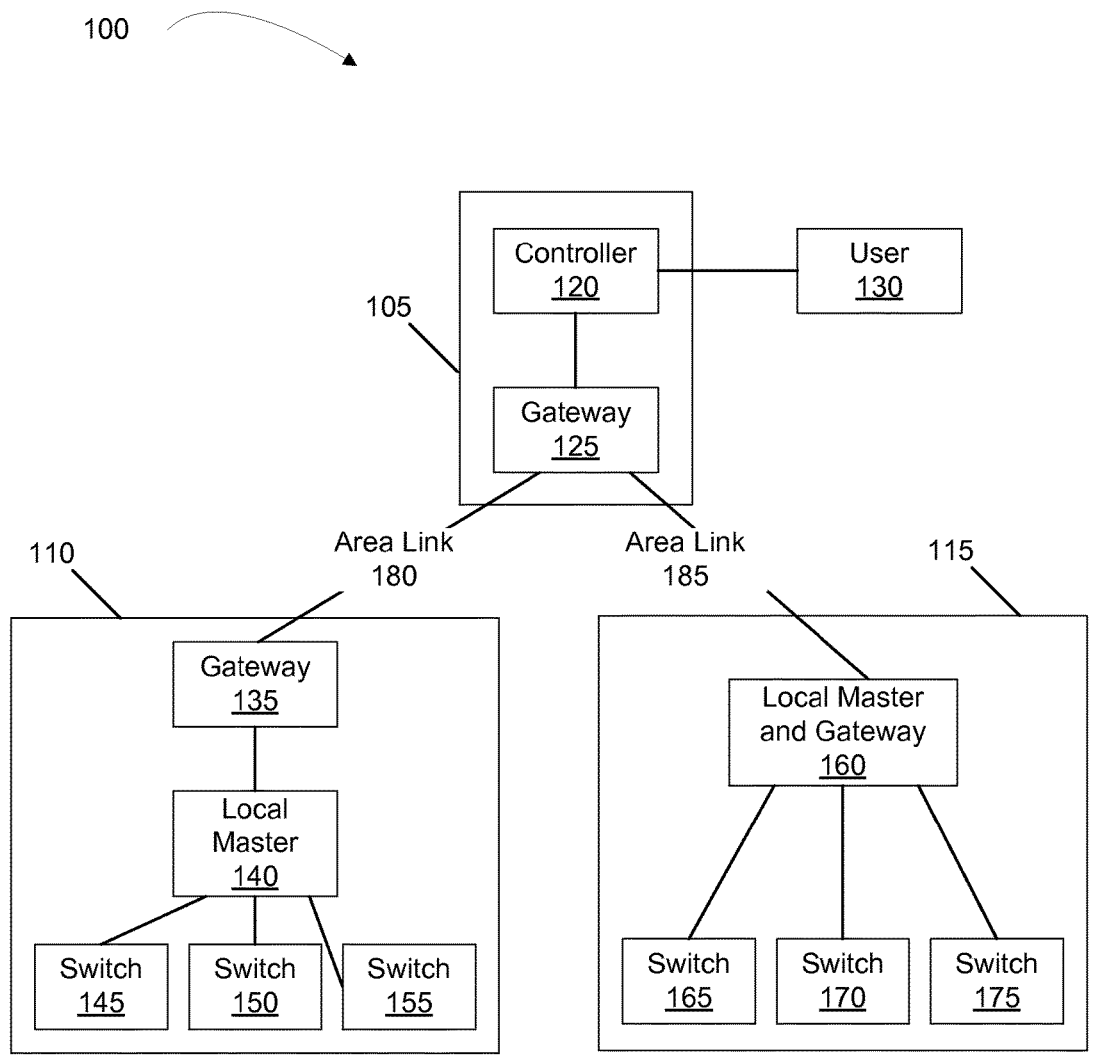
FIG. 1 shows a network architecture of a management network in accordance with some embodiments.

Reference will now be made in detail to various embodiments, examples of which are illustrated in the accompanying drawings. While various embodiments are described herein, it will be understood that these various embodiments are not intended to limit the scope of the embodiments. On the contrary, the embodiments are intended to cover alternatives, modifications, and equivalents, which may be included within the scope of the embodiments as construed according to the appended Claims. Furthermore, in the following detailed description of various embodiments, numerous specific details are set forth in order to provide a thorough understanding of the concept. However, it will be evident to one of ordinary skill in the art that the concept may be practiced without these specific details. In other instances, well known methods, procedures, components, and circuits have not been described in detail as not to unnecessarily obscure aspects of the concept and embodiments.

Some portions of the detailed descriptions that follow are presented in terms of procedures, logic blocks, processing, and other symbolic representations of operations on data bits within a computer memory. These descriptions and representations are the means used by those skilled in the data processing arts and data communication arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in an electronic device, a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "storing," "retrieving," "determining," "sending," "receiving," "transmitting," "communicating," "providing," "accessing," "associating," "disabling," "enabling," "configuring," "initiating," "starting," "terminating," "ending," "configuring," "forming," "grouping," "detecting," "reverting," "selecting," "updating" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of machine-executable instructions residing on some form of machine-readable storage medium, such as program modules, executed by one or more computers, computing devices, or other devices. By way of example, and not limitation, machine-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and non-volatile, removable and non-removable media implemented in any method or technology for storage of information such as machine-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody machine-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of machine-readable storage media.

Embodiments described herein are directed to management networks that provide a capability to manage several underlying management networks. In some embodiments, management networks with such a capability may aggregate several underlying management networks to form a single management network through which the several underlying management networks are managed.

Referring now to FIG. 1, a network architecture of management network 100 is shown in accordance with some embodiments. As shown, management network 100 includes network areas 105, 110, and 115 (also referred to as management plane networks). In some embodiments each of network areas 105, 110, and 115 is a loop-free broadcast domain. It is appreciated that a loop-free broadcast domain may be implemented using any number of different networking technologies, e.g., spanning tree protocol (STP) technologies, networking technologies described in commonly-owned United States Patent Publication 2014/0036661, filed Jan. 30, 2013, etc. United States Patent Publication 2014/0036661.

As illustrated in FIG. 1, network area 110 includes gateway 135, local master 140 and switches 145, 150, and 155. Network area 115 includes local master and gateway 160 and switches 165, 170, and 175. Network area 105 includes controller 120 and gateway 125.

Gateway 135 is a node that may establish a communication link (e.g., area link 180) with gateway 125 of network area 105, thereby providing a connection between network area 110 and network area 105. It is appreciated that the communication link may be a physical Ethernet link or a tunneled virtual link. In some embodiments, the communication link established between gateways 135 and 125 is used for transmitting bridge protocol data unit (BPDU) data and layer 3 data. It is appreciated that, in some embodiments, communication between gateways 125 and 135 does not allow managed layer 2 traffic. Gateway 135 may also facilitate exchange of information (e.g., node identification information) between nodes in network area 110 (e.g., local master 140) and nodes in network area 105 (e.g., controller 120). In some embodiments, gateway 135 is implemented as a network switch (e.g., a layer 2 and/or layer 3 network switch), a computing device, a server, etc.

Local master 140 is a node that may manage (e.g., monitor, configure, update, modify, etc.) switches in network area 110. In this example, local master 140 manages switches 145, 150, and 155. Local master 140 may also receive commands and/or instructions from controller 120 regarding the management of switches in network area 110. In some embodiments, local master 140 is implemented as a network switch (e.g., a layer 2 and/or layer 3 network switch), a computing device, a server, etc.

Switches 145, 150, and 155 are network switches (e.g., layer 2 and/or layer 3 network switches) that may forward and/or route network data (e.g., packets) to nodes (e.g., local master 140, other networking devices not shown) and/or hosts (not shown) in network area 110. Switches 145, 150, and 155 may be managed by local master 140. For instance, switches 145, 150, and 155 may receive instructions and/or commands from local master 140 regarding the manner in which to forward and/or route network data through network area 110.

In this example, local master and gateway 160 is a node that performs similar functions as gateway 135 and local master 140. That is, local master and gateway 160 may establish a communication link (e.g., area link 185) with gateway 125, thereby providing a connection between network area 115 and network area 105. In some embodiments, the communication link established between local master and gateway 160 and gateway 125 is used for transmitting BPDU data and layer 3 data. It is appreciated that, in some embodiments, communication between gateway 125 and local master and gateway 160 does not allow managed layer 2 traffic. It is appreciated that the communication link may be a physical Ethernet link or a tunneled virtual link. Local master and gateway 160 may also facilitate exchange of information (e.g., node identification information) between nodes in network area 115 (e.g., local master and gateway 160) and nodes in network area 105 (e.g., controller 120).

In addition, local master and gateway 160 may manage (e.g., monitor, configure, update, modify, etc.) switches in network area 115. In this example, local master and gateway 160 manages switches 165, 170, and 175. Local master and gateway 160 may also receive commands and/or instructions from controller 120 regarding the management of switches in network area 115. In some embodiments, local master and gateway 160 is implemented as a network switch (e.g., a layer 2 and/or layer 3 network switch), a computing device, a server, etc.

Switches 165, 170, and 175 are network switches (e.g., layer 2 and/or layer 3 network switches) that may forward and/or route network data (e.g., packets) to nodes (e.g., local master and gateway 160, other networking devices not shown) and/or hosts (not shown) in network area 115. Switches 165, 170, and 175 may be managed by local master and gateway 160. For example, switches 165, 170, and 157 may receive instructions and/or commands from local master and gateway 160 regarding the manner in which to forward and/or route network data through network area 115.

Controller 120 is a node that receives from user 130 (e.g., a network manager) instructions and/or commands for managing switches in network areas 110 and 115 (e.g., switches 145, 150, 155, 165, 170 and 175). In some embodiments, controller 120 provides an interface (e.g., a command line interface (CLI), a graphical user interface (GUI), etc.,) through which user 130 manages the switches in network areas 110 and 115. Based on instructions and/or commands from user 130, controller 120 may direct local masters (e.g., local master 140 and local master and gateway 160) in network areas 110 and 115 to manage switches in their respective network area. In this manner, controller 120 provides user 130 with a centralized management capability for managing several network areas (e.g., network areas 110 and 115). In other words, controller 120 aggregates multiple management plane networks into a single management plane network and allows user 130 to manage the multiple management plane networks through the single management plane network.

Gateway 125 is a node that may establish communication links (e.g., area links 180 and 185) with gateways 135 and 160, thereby providing a connection between network area 105 and network area 110 and a connection between network area 105 and network area 115. As mentioned above, the communication links established between gateways 135 and 125, and gateway 125 and local master and gateway 160 are used for transmitting BPDU data and layer 3 data. It is appreciated that, in some embodiments, communication between gateway 125 and local master and gateway 160 does not allow managed layer 2 traffic. It is appreciated that the communication links may be a physical Ethernet link or a tunneled virtual link. Gateway 125 may also facilitate exchange of information (e.g., node identification information) between nodes in network area 105 (e.g., controller 120) and nodes in network areas 110 (e.g., local master 140) and 115 (e.g., local master and gateway 160). In some embodiments, gateway 125 is implemented as a network switch (e.g., a layer 2 and/or layer 3 network switch), a computing device, a server, etc. It is appreciated that controller 120 and gateway 125 may be implemented as a single node.

Gateways, local masters, a local master and gateway, and a controller illustrated in FIG. 1 are each described above as a single node. It is appreciated that any of the gateways, local masters, local master and gateway, and controller may be implemented as several nodes. For example, one of several nodes may implement a gateway, local master, local master and gateway, or controller while the remaining nodes of the several nodes serve as backup nodes for the purpose of redundancy. As another example, functionalities of a gateway, local master, local master and gateway, or controller may be implemented across several nodes (e.g., each of the several nodes may be responsible for a portion or subset of the functionalities) for the purpose of distributing the functionalities among the several nodes.

As explained above, communication links may be established between gateways of different network areas (e.g., area link 180 established between gateways 135 and 125 and area link 185 established between gateway 125 and local master and gateway 160). Different embodiments may use different techniques for enabling such communication links. In some embodiments, when an area link (e.g., a physical Ethernet link and/or a tunneled virtual link) is connected between gateways, information may be exchanged (e.g., in the form of BPDU data) between the gateways in order to enable the area link. Examples of such information may include a gateway's network address (e.g., an Internet Protocol version 6 (IPv6) link-local address) associated with the area link, a virtual local area network (VLAN) identifier (ID) for transmitting inter-network area data, information (e.g., a node ID) identifying a gateway, information (e.g., a network area ID or area ID) identifying a network area to which a controller belongs, information (e.g., a network area ID or area ID) identifying a network area to which a gateway belongs, etc.

The area link may be enabled if (1) both gateways are configured to establish an area link; (2) both gateways are configured with the same VLAN ID; (3) both gateways are configured with the same management network name; (4) from the perspective of each gateway, the area link is configured to connect with the network area to which the other gateway belongs; and (5) each gateway is configured to establish the area link with the network area to which the other gateway belongs. It is appreciated that additional and/or different criteria may be utilized for enable an area link.

Figure 2:
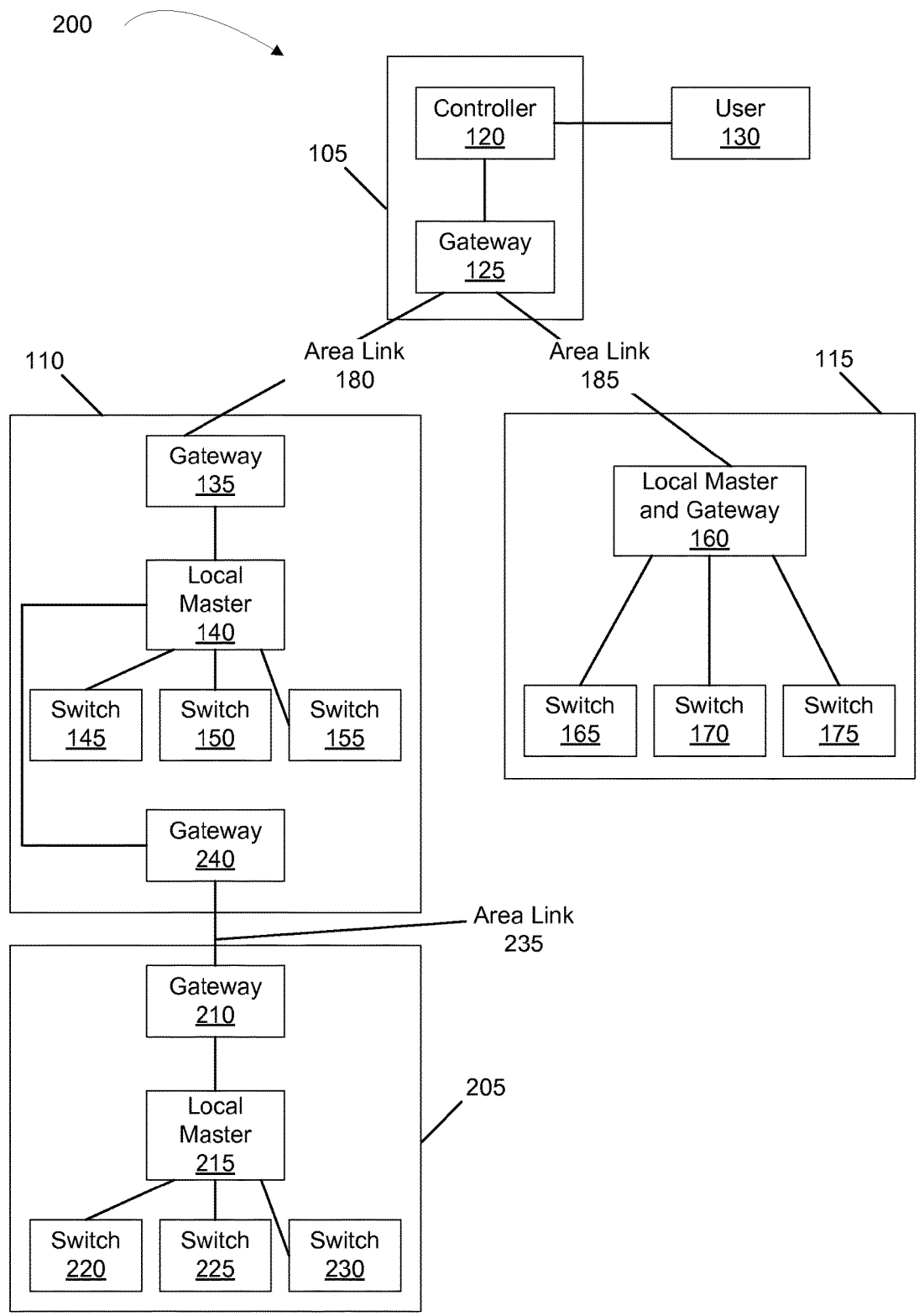
FIG. 2 shows a network area added to the management network illustrated in FIG. 1 in accordance with some embodiments.

Referring now to FIG. 2, a network area added to management network 200 is shown in accordance with some embodiments. Specifically, management network 200 is similar to management network 100 except that management network 200 also includes network area 205 and that network area 110 includes gateway 240.

As shown, network area 205 includes gateway 210, local master 215 and switches 220, 225, and 230. Gateway 210 is a node that may establish a communication link (e.g., area link 235) with gateway 240, thereby providing a connection between network area 110 and network area 205. It is appreciated that the communication link may be a physical Ethernet link or a tunneled virtual link. In some embodiments, the communication link established between gateways 210 and 240 is used for transmitting BPDU data and layer 3 data. It is appreciated that, in some embodiments, communication between gateways 210 and 240 does not allow managed layer 2 traffic. Gateway 210 may also facilitate exchange of information (e.g., node identification information) between nodes in network area 205 (e.g., local master 215) and nodes in network area 110 (e.g., local master 140). In some embodiments, gateway 210 is implemented as a network switch (e.g., a layer 2 and/or layer 3 network switch), a computing device, a server, etc.

Local master 215 is a node that may manage (e.g., monitor, configure, update, modify, etc.) switches in network area 205. In this example, local master 215 manages switches 220, 225, and 230. Local master 215 may also receive commands and/or instructions from controller 120 regarding the management of switches in network area 205. In some embodiments, local master 215 is implemented as a network switch (e.g., a layer 2 and/or layer 3 network switch), a computing device, a server, etc.

Switches 220, 225, and 230 are network switches (e.g., layer 2 and/or layer 3 network switches) that may forward and/or route network data (e.g., packets) to nodes (e.g., local master 215, other networking devices not shown) and/or hosts (not shown) in network area 205. Switches 220, 225, and 230 may be managed by local master 215. For instance, switches 220, 225, and 230 may receive instructions and/or commands from local master 215 regarding the manner in which to forward and/or route network data through network area 205.

Gateway 240 is a node that may establish a communication link (e.g., area link 235) with gateway 210, thereby providing a connection between network area 110 and network area 205. It is appreciated that the communication link may be a physical Ethernet link or a tunneled virtual link. In some embodiments, the communication link established between gateways 240 and 210 is used for transmitting BPDU data and layer 3 data. It is appreciated that, in some embodiments, communication between gateways 240 and 210 does not allow managed layer 2 traffic. Gateway 240 may also facilitate exchange of information (e.g., node identification information) between nodes in network area 110 (e.g., local master 140) and nodes in network area 205 (e.g., local master 215). In some embodiments, gateway 240 is implemented as a network switch (e.g., a layer 2 and/or layer 3 network switch), a computing device, a server, etc.

FIG. 2 also illustrates that different network areas have different distances (also referred to as controller distances) from the network area to which a controller belongs. In some embodiments, such distances are expressed in terms of a number of network areas from the network area to which a controller belongs. For example, network area 105 is the network area to which controller 120 belongs and, thus, network area 105 has a controller distance of 0. As another example, network areas 110 and 115 are directly connected to the network area (e.g. network area 105) to which controller 120 belongs and thus each has a controller distance of 1. As yet another example, network area 205 is connected to the network area (e.g., network area 105) to which controller 120 belongs through network area 110 and thus has a controller distance of 2.

Figure 3A:
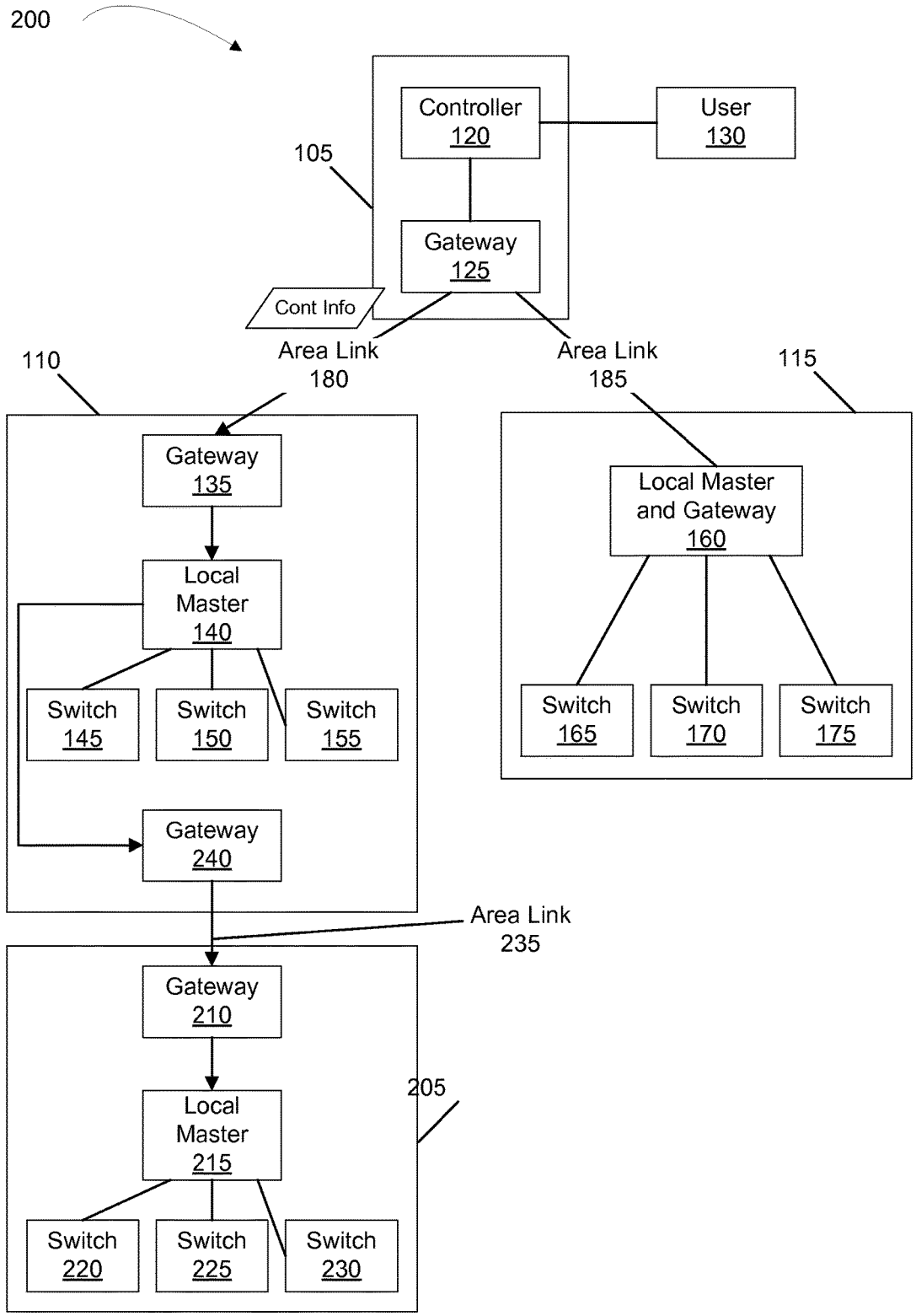
FIGS. 3A-3E show examples of node information being distributed through a management network in accordance with some embodiments.
Figure 3B:
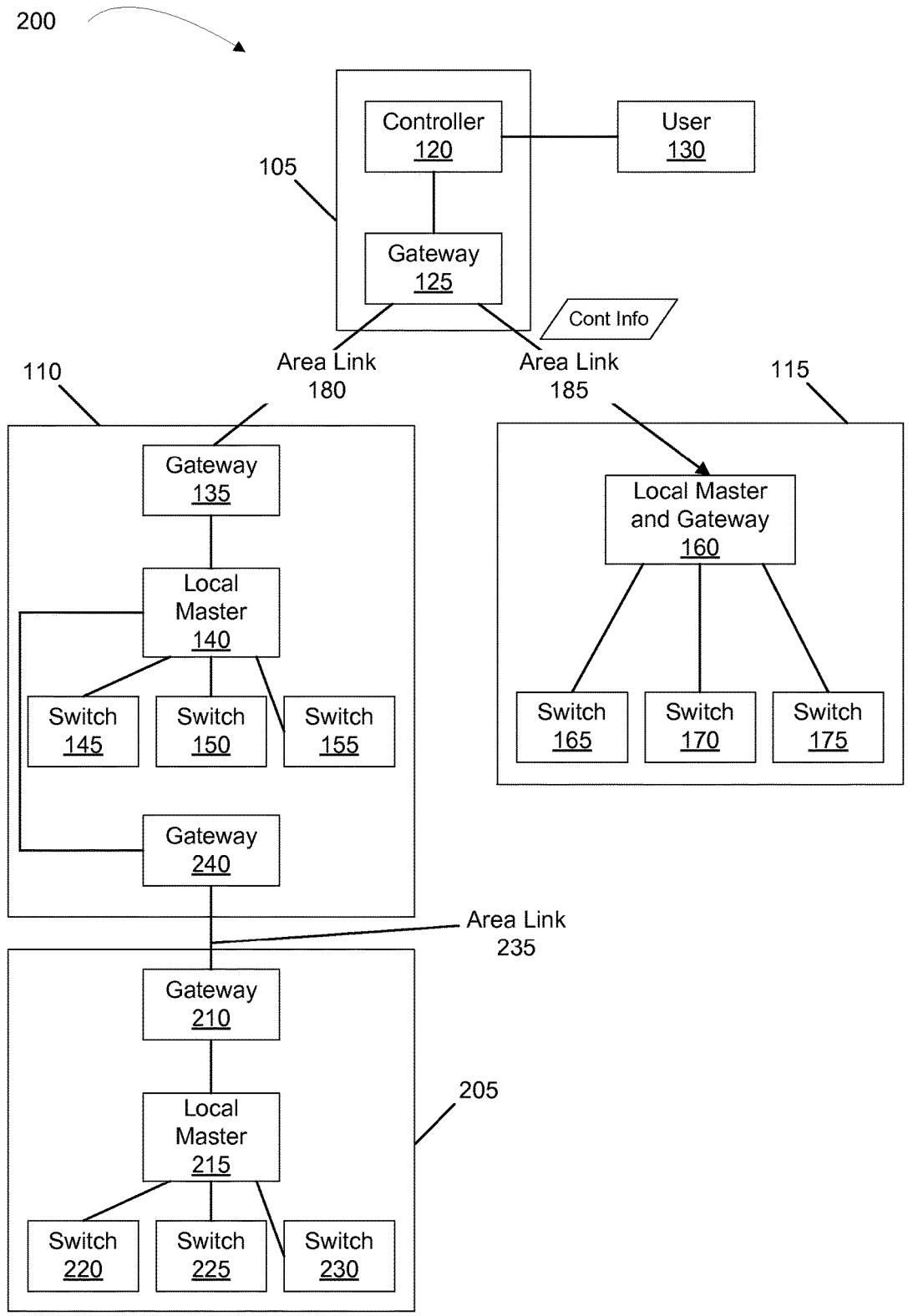
Figure 3C:
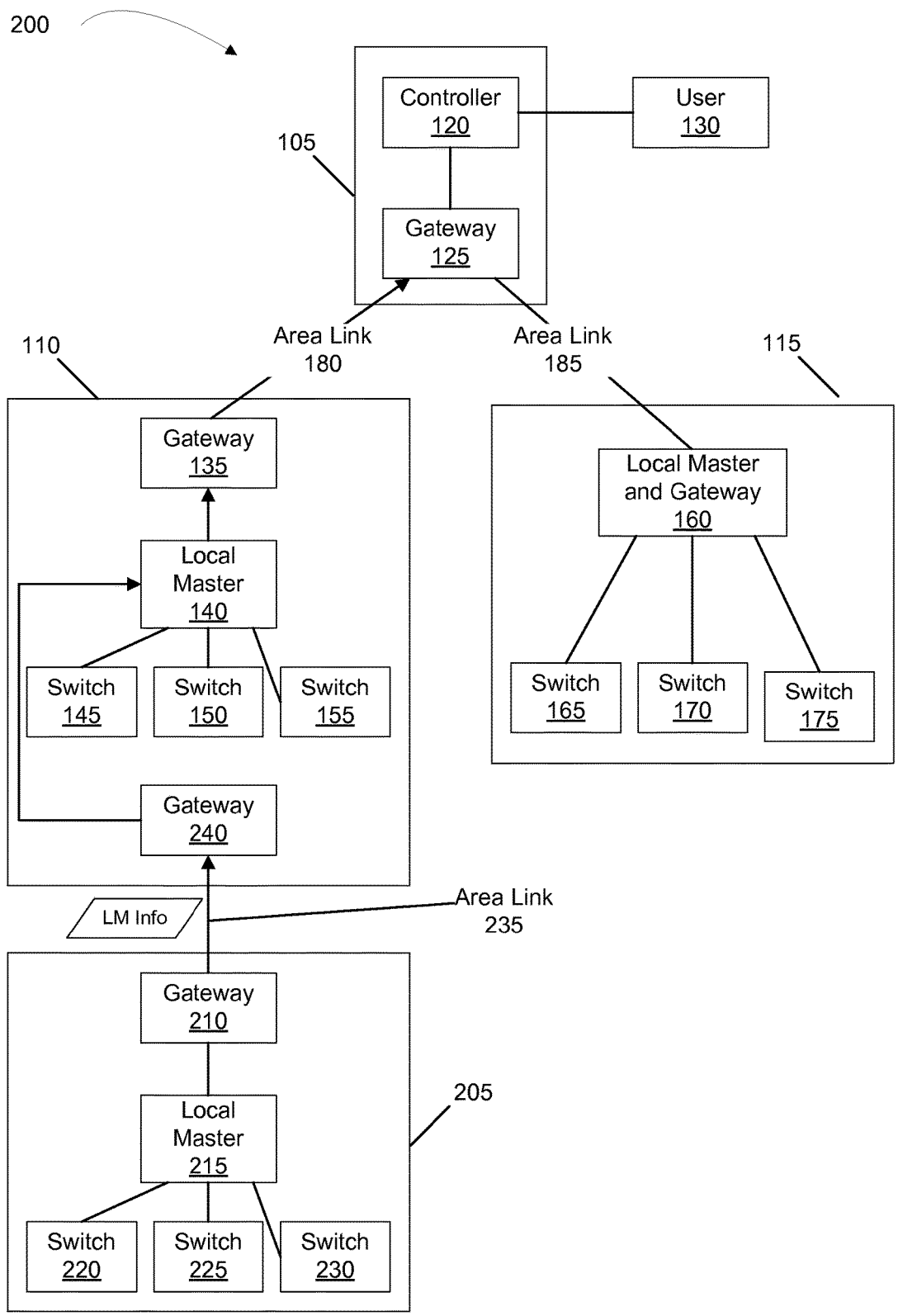
Figure 3D:
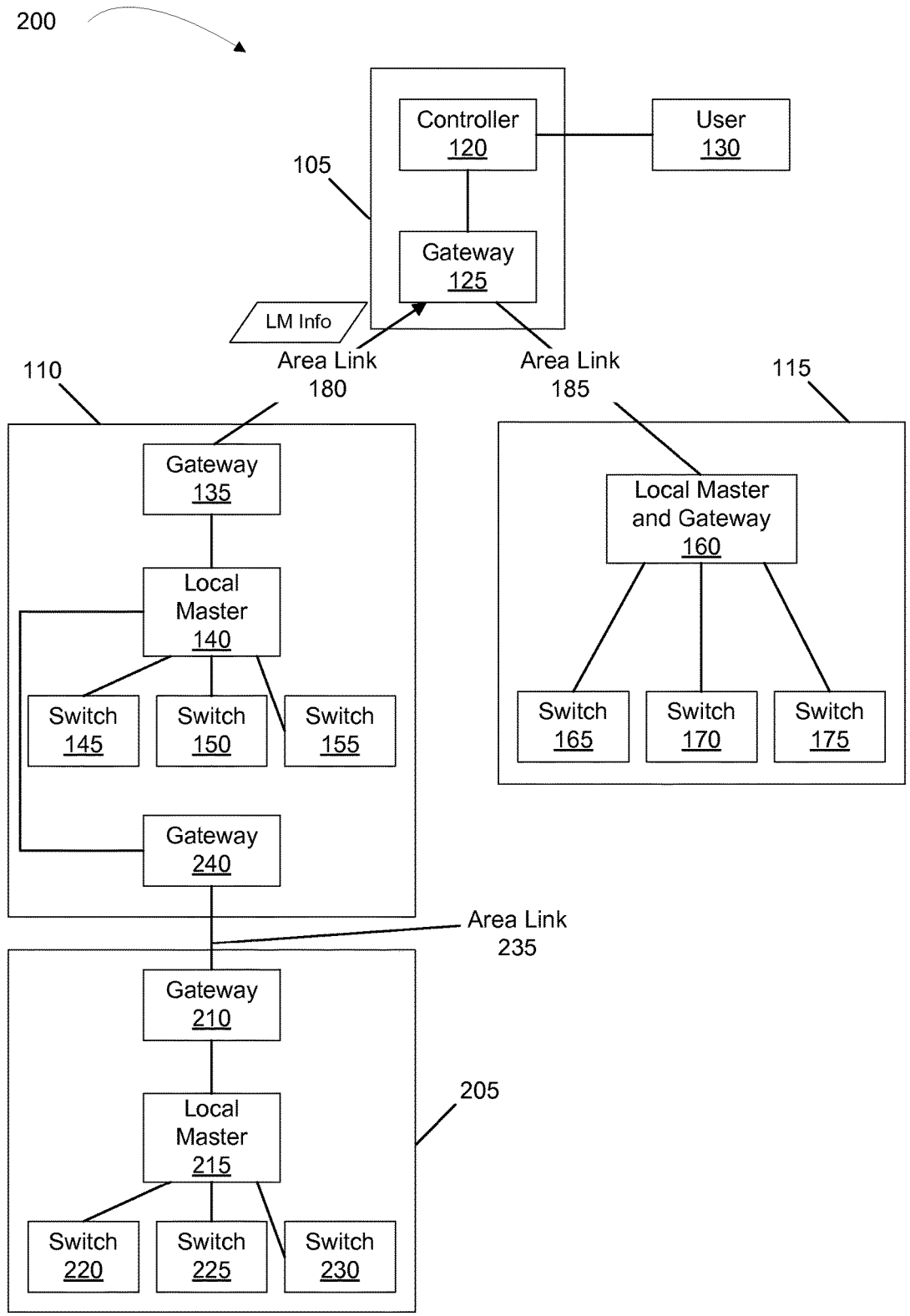
Figure 3E:
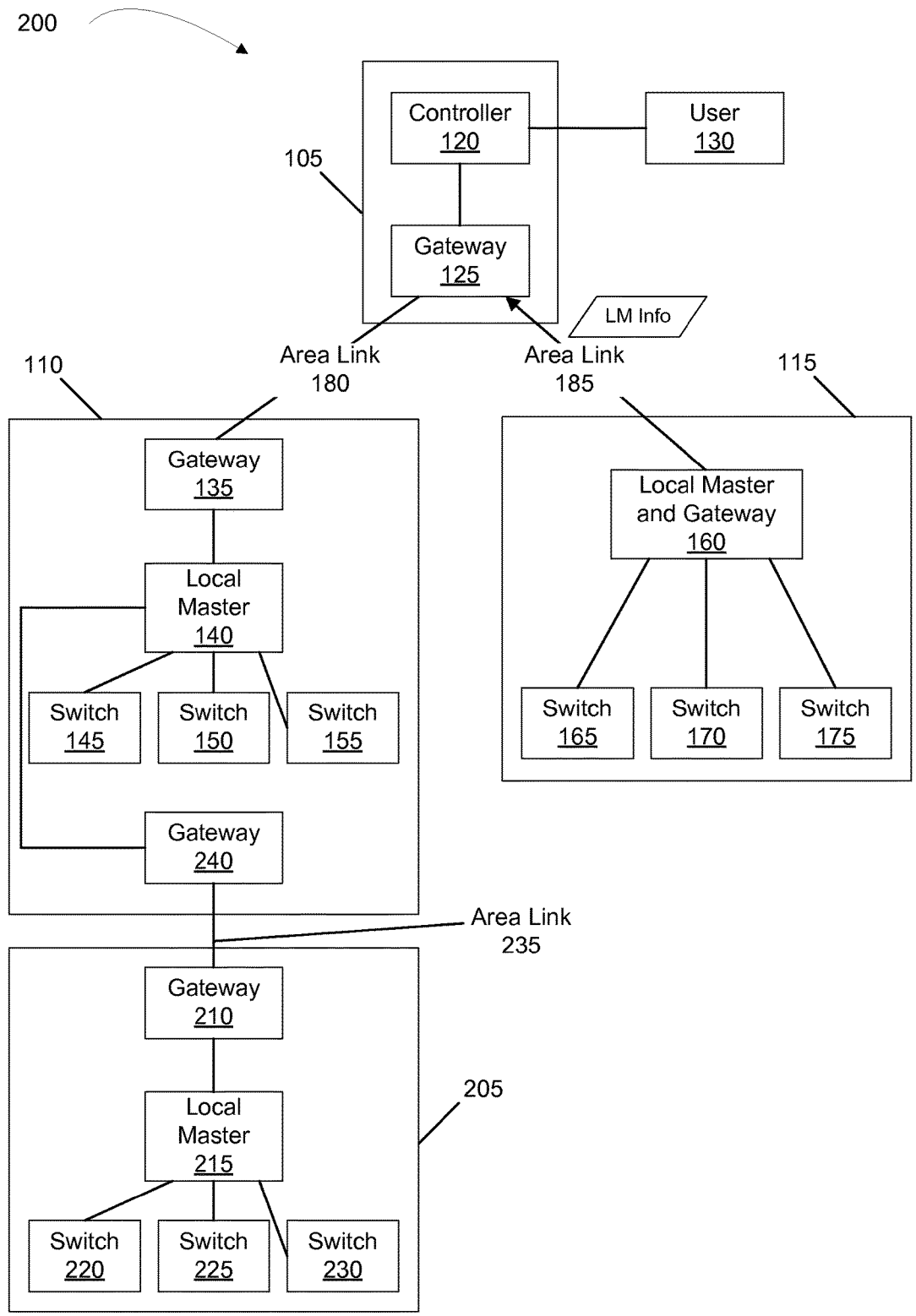

FIGS. 3A-3E show examples of node information being distributed through management network 200 according to some embodiments. In particular, FIGS. 3A and 3B illustrate a sending gateway transmitting information associated with a controller(s) (e.g., controller 120) in management network 200 to a receiving gateway when the sending gateway belongs to a network area with a lower controller distance than the network area to which the receiving gateway belongs. FIGS. 3C-3E illustrate a sending gateway transmitting information associated with a local master(s) (e.g., local master 140, local master and gateway 160, and/or local master 215) in management network 200 to a receiving gateway when the sending gateway belongs to a network area with a higher controller distance than the network area to which the receiving gateway belongs.

Referring now to FIG. 3A, a distribution of controller information through management network 200 is shown in accordance with some embodiments. As illustrated, gateway 125 transmits information (e.g., formatted as BPDU data), which is labeled "Cont Info", that identifies controller 120 to gateway 135. In some embodiments, examples of information that identifies controller 120 may include information (e.g., a node ID) identifying controller 120, information (e.g., a network area ID or area ID) identifying the network area (e.g., network area 105) to which controller 120 belongs, etc. Upon receiving the information, gateway 135 may generate layer 3 routes to controller 120. This way, when gateway 135 receives data destined for controller 120, gateway 135 may route such data to gateway 125, which forwards the data to controller 120. In addition, gateway 135 may distribute the information that identifies controller 120 to local master 140, gateway 240, and any other nodes (e.g., local masters, gateways, local master and gateways, etc.) that may be in network area 110, or any combination thereof. In some embodiments, gateway 135 distributes the information using a reliable transport mechanism over the managed layer 2 network in network area 110.

Gateway 240 may distribute the information that identifies controller 120 to gateway 210, which in turn distributes the information to local master 215 and any other nodes (e.g., local masters, gateways, local master and gateways etc.) that may be in network area 205, or any combination thereof. In some embodiments, gateway 210 distributes the information using a reliable transport mechanism over the managed layer 2 network in network area 205. Gateway 210 may generate layer 3 routes to controller 120 so that when gateway 210 receives data destined for controller 120, gateway 210 may route such data to gateway 240. Gateway 240 may forward the data directly to gateway 135 or indirectly to gateway 135 through local master 140. Gateway 135 may then route the data to gateway 125, which forwards the data to controller 120.

FIG. 3B shows gateway 125 transmitting information (e.g., formatted as BPDU data), which is labeled "Cont Info", that identifies controller 120 to local master and gateway 160. Upon receiving such information, local master and gateway 160 may generate layer 3 routes to controller 120. This way, when local master and gateway 160 receives data destined for controller 120, local master and gateway 160 may route such data to gateway 125, which forwards the data to controller 120. Additionally, local master and gateway 160 may distribute the information that identifies controller 120 to any other nodes (e.g., local masters, gateways, local master and gateways, etc.) that may be in network area 115, or any combination thereof. In some embodiments, local master and gateway 160 distributes the information using a reliable transport mechanism over the managed layer 2 network in network area 115.

Referring now to FIG. 3C, a distribution of local master information through management network 200 is shown in accordance with some embodiments. In this example, gateway 210 transmits information (e.g., formatted as BPDU data), which is labeled "LM Info", that identifies local master 215 to gateway 240. Examples of information that identifies local master 215 may include information (e.g., a node ID) identifying local master 215, information (e.g., a network area ID or area ID) identifying the network area (e.g., network area 205) to which local master 215 belongs, etc. Upon receiving the information, gateway 240 may generate layer 3 routes to local master 215. This way, when gateway 240 receives data destined for local master 215, gateway 240 may route such data to gateway 210, which forwards the data to local master 215. Additionally, gateway 240 may distribute the information that identifies local master 215 to local master 140, gateway 135, and any other nodes (e.g., local masters, gateways, local master and gateways, etc.) that may be in network area 110, or any combination thereof. In some embodiments, gateway 240 distributes the information using a reliable transport mechanism over the managed layer 2 network in network area 205.

In addition, FIG. 3C shows gateway 135 distributing the information that identifies local master 215 to gateway 125, which in turn distributes the information to controller 120 and any other nodes (e.g., controllers) in network area 105. In some embodiments, gateway 125 distributes the information using a reliable transport mechanism over the managed layer 2 network in network area 105. Gateway 125 may generate layer 3 routes to local masters 215 so that when gateway 125 receives data destined for local master 215, gateway 125 may route such data to gateway 135. Gateway 135 may forward the data directly to gateway 240 or indirectly to gateway 240 through local master 140. Gateway 240 may then route the data to gateway 210, which forwards the data to local master 215.

FIG. 3D illustrates gateway 135 transmitting information (e.g., formatted as BPDU data), which is labeled "LM Info", that identifies local master 140 to gateway 125. Examples of information that identifies local master 140 may include information (e.g., a node ID) identifying local master 140, information (e.g., a network area ID or area ID) identifying the network area (e.g., network area 110) to which local master 140 belongs, etc. Upon receiving the information, gateway 125 may generate layer 3 routes to local master 140. This way, when gateway 125 receives data destined for local master 140, gateway 125 may route such data to gateway 135, which forwards the data to local master 140.

In some embodiments, gateway 135 distributes the information that identifies local master 215 to gateway 125 simultaneously with distributing the information that identifies local master 140 to gateway 125. In other embodiments, gateway 135 distributes the information that identifies local master 215 to gateway 125 separately from distributing the information that identifies local master 140 to gateway 125.

FIG. 3E shows local master and gateway 160 transmitting information (e.g., formatted as BPDU data), which is labeled "LM Info", that identifies local master and gateway 160 to gateway 125. Examples of information that identifies local master and gateway 160 may include information (e.g., a node ID) identifying local master and gateway 160, information (e.g., a network area ID or area ID) identifying the network area (e.g., network area 115) to which local master and gateway 160 belongs, etc. Upon receiving the information, gateway 125 may generate layer 3 routes to local master and gateway 160. This way, when gateway 125 receives data destined for local master and gateway 160, gateway 125 may route such data to local master and gateway 160.

As described above in FIGS. 3A-3E, layer 3 routes are generated between the network area (e.g., network area 105) of the controller and network areas (e.g., network areas 110 and 115) directly connected to the network area of the controller. Layer 3 routes are not generated between network areas directly connected to the network are of the controller.

Figure 4:
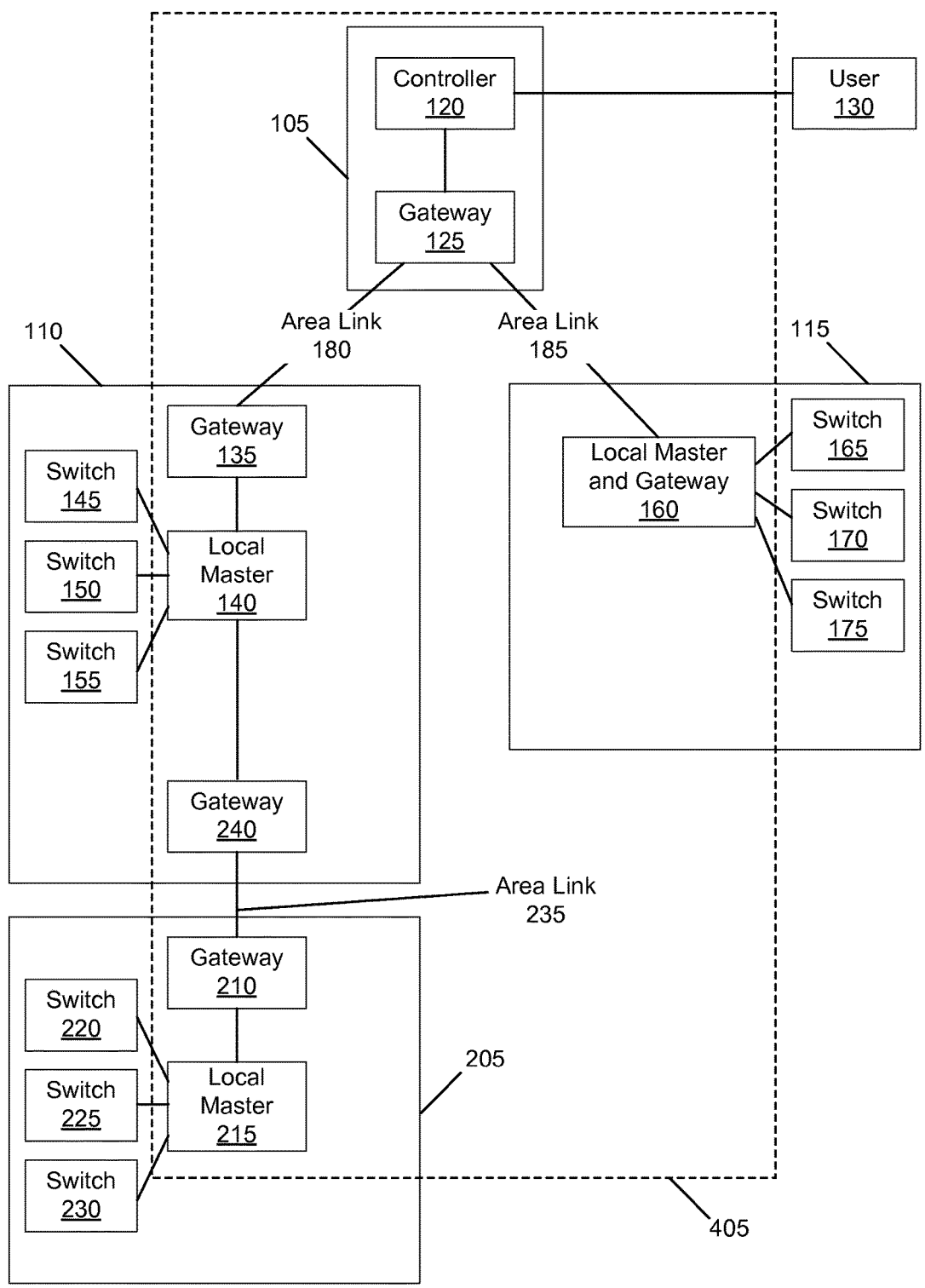
FIG. 4 shows a layer 3 network of nodes in accordance with some embodiments.

Referring now to FIG. 4, a layer 3 network 405 of nodes is shown in accordance with some embodiments. As illustrated, layer 3 network 405 includes controller 120, gateway 125, gateway 135, local master 140, gateway 240, gateway 210, local master 215, and local master and gateway 160. For this example, layer 3 network 405 is formed upon the exchange of node information described above by reference to FIGS. 3A-3E. This manner of generating layer 3 routes allows controller 120 to communicate with nodes in other network areas (e.g., network areas 110, 115 and 205). For instance, controller 120 may manage switches 145, 150 and 155 by connecting to local master 140 through layer 3 network 405, manage switches 220, 225 and 230 by connecting to local master 215 through layer 3 network 405, and manage switches 165, 170 and 175 by connecting to local master and gateway 160 through layer 3 network 405. In addition, this manner of generating layer 3 routes prevents nodes in network areas (e.g., network areas 110 and 115) that are directly connected to the network area (e.g., network area 105) to which controller 120 belongs from communicating with each other. For example, local master 140 cannot communicate with local master and gateway 160.

In some embodiments, nodes (e.g., gateways, local masters, local master and gateways, controllers, switches, etc.) in a management network (e.g., management network 100 and management network 200) utilize a layer 3 network to facilitate inter-network area communication. For example, an IPv6 Unique Local Address block is used in some such embodiments, where the layer 3 network address of each node is generated based on a specified prefix, an identifier (e.g., a network area ID or area ID) associated with a network area to which the node belongs, and an identifier (e.g., a node ID) associated with the node. As explained above, each local master (e.g., local master 140, local master and gateway 160, local master 215) shares its respective node ID and network area ID with the controller (e.g., controller 120). Similarly, the controller shares its respective node ID and network area ID with each of the local masters (including local master and gateway 160). As such, the controller may derive the layer 3 network address of a local master based on the shared information. Moreover, a local master may derive the layer 3 network address of the controller based on the shared information. In this manner, the controller and local masters may maintain layer 3 routes for inter-network area communication without manual (e.g., human) intervention.

In some embodiments, once controller 120 detects that a network area (e.g., network area 110, network area 115, and network area 210) is reachable, controller 120 directly connects to a local master (e.g., local master 140, local master and gateway 160, or local master 215) in the network area and exchanges authentication information using configured passwords. If the authentication succeeds, then controller 120 can manage each of the nodes (e.g., switches 145, 150, and 155, switches 165, 170, and 175 or switches 220, 225, and 230) in the network area. It is appreciated that controller 120 may manage such nodes in the same or similar manner as that described in United States Patent Publication 2014/0237047, filed Feb. 18, 2014. United States Patent Publication 2014/0237047. In some embodiments, communication between controller 120 and a node in a network area may be encrypted.

FIGS. 1-4 illustrate gateways, local masters, switches, and controllers that are part of a management network. It is appreciated that such nodes in the management network may be referred to as managed devices, managed nodes, and/or managed switches. In addition, FIGS. 1-4 show a management network with a specific number of network areas, nodes, controllers, gateways, local masters, local master and gateways, and/or switches. It is appreciated that a management network may include any number of additional and/or different network areas, nodes, controllers, gateways, local masters, local master and gateways, and/or switches. Also, network areas may be connected to the network area to which controllers belong in any number of different ways.

FIG. 5 shows a flow diagram 500 for managing switches in a management network in accordance with some embodiments. In some embodiments, a controller (e.g., controller 120) performs the operations described in flow diagram 500 to manage switches in different network areas (e.g., network areas 110, 115, and 205). At step 510, a connection is established with a local master. In some embodiments, the connection is established over a layer 3 network (e.g., network 405). As mentioned above, authentication may be exchanged with the local master for purposes of security.

At step 520, a command to manage a switch is received from a user. In some embodiments, the switch is directly managed by the local master. It is appreciated that the command may be received through an interface (e.g., a CLI, a GUI, etc.). The local master is directed to manage the switch based on the received command at step 530. In some embodiments, the local master is directed to manage the switch using the connection to the local master over the layer 3 network.

Figure 6:
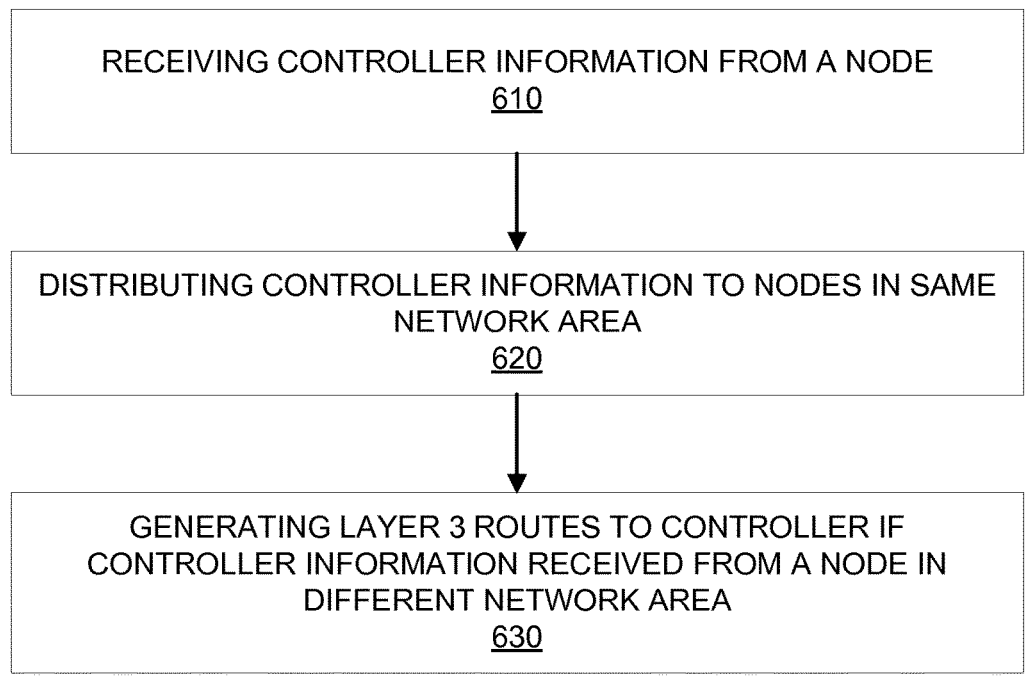
FIG. 6 shows a flow diagram for distributing controller information in accordance with some embodiments.

FIG. 6 shows a flow diagram 600 for distributing controller information in accordance with some embodiments. In some embodiments, a gateway (e.g., gateway 135, local master and gateway 160, gateway 125, etc.) that receives controller information performs the operations described in flow diagram 600. At step 610, controller information is received from a node (e.g., a gateway, a local master, a local master and gateway).

At step 620, the controller information is distributed to nodes in the same network area. In some embodiments, operation 620 is performed if the controller information is received from a node in a different network area. Referring to FIG. 3A as an example, gateway 135 distributes controller information for controller 120 to local master 140 and gateway 240, both of which are nodes in the same network area (e.g., network area 110) as gateway 135.

Layer 3 routes to the controller are generated at step 630 if the controller information is received from a node from a different network area. Referring to FIG. 3A as an example, gateway 135 receives controller information from gateway 125, which is a node in a different network area than the network area to which gateway 135 belongs. Accordingly, gateway 135 generates layer 3 routes to controller 120 so that gateway 135 may route data destined for controller 120 to gateway 125 when gateway 135 receives such data.

FIG. 7 shows a flow diagram 700 for distributing local master information in accordance with some embodiments.

In some embodiments, a gateway (e.g., gateway 135, local master and gateway 160, gateway 125, etc.) that receives local master information performs the operations described in flow diagram 700. At step 710, local master information is received from a node (e.g., a gateway, a local master, a local master and gateway).

At step 720, the local master information is distributed to nodes in the same network area. In some embodiments, operation 720 is performed if the local master information is received from a node in a different network area. Referring to FIG. 3C as an example, gateway 240 distributes local master information for local master 215 to local master 140 and gateway 135, both of which are nodes in the same network area (e.g., network area 110) as gateway 240.

Layer 3 routes to the local master are generated at step 730 if the local master information is received from a node from a different network area. Referring to FIG. 3C as an example, gateway 240 receives local master information from gateway 210, which is a node in a different network area than the network area to which gateway 240 belongs. Accordingly, gateway 240 generates layer 3 routes to local master 215 so that gateway 240 may route data destined for local master 215 to gateway 210 when gateway 240 receives such data.

Figure 8:
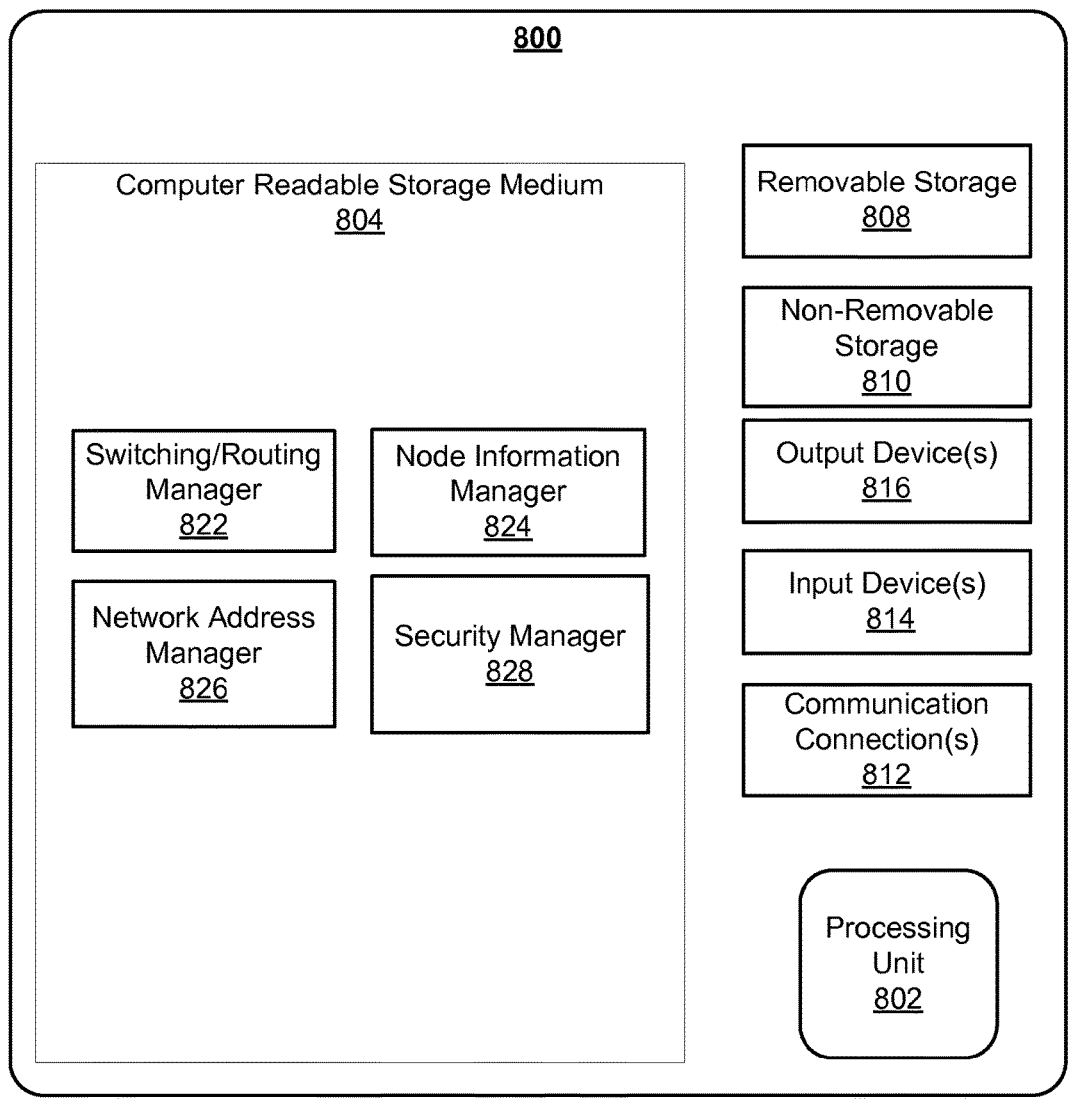
FIG. 8 shows a computer system in accordance with some embodiments.

Referring now to FIG. 8, a block diagram of a computer system in accordance with some embodiments is shown. With reference to FIG. 8, a system module for implementing embodiments includes a general purpose computing system environment, such as computing system environment 800. Computing system environment 800 may include, but is not limited to, servers, switches, routers, desktop computers, laptops, tablets, mobile devices, and smartphones. In its most basic configuration, computing system environment 800 typically includes at least one processing unit 802 and machine readable storage medium 804. Depending on the exact configuration and type of computing system environment, machine readable storage medium 804 may be volatile (such as RAM), non-volatile (such as ROM, flash memory, etc.) or some combination of the two. Portions of machine readable storage medium 804 when executed aggregates multiple management plane networks into a single management plane network (e.g., processes 600 and 700) and allows a user to manage the multiple management plane networks through the single management plane network (e.g., process 500).

Additionally, in various embodiments, computing system environment 800 may also have other features/functionality. For example, computing system environment 800 may also include additional storage (removable and/or non-removable) including, but not limited to, magnetic or optical disks or tape. Such additional storage is illustrated by removable storage 808 and non-removable storage 810. Computer storage media includes volatile and nonvolatile, removable and non-removable media implemented in any method or technology for storage of information such as machine readable instructions, data structures, program modules or other data. Machine readable medium 804, removable storage 808 and nonremovable storage 810 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 800. Any such computer storage media may be part of computing system environment 800.

In some embodiments, computing system environment 800 may also contain communications connection(s) 812 that allow it to communicate with other devices. Communications connection(s) 812 is an example of communication media. Communication media typically embodies machine readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term machine readable media as used herein includes both storage media and communication media.

Communications connection(s) 812 may allow computing system environment 800 to communicate over various networks types including, but not limited to, fibre channel, small computer system interface (SCSI), Bluetooth, Zigbee, Z-Wave, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 812 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 800 may also have input device(s) 814 such as keyboard, mouse, a terminal or terminal emulator (either connected or remotely accessible via telnet, SSH, http, SSL, etc.), pen, voice input device, touch input device, remote control, etc. Output device(s) 816 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, machine readable storage medium 804 includes a network switching/routing manager module 822, a node information manager module 824, a network address manager module 826, and a security module 828. The network switching/routing manager module 822 is operable to handle switching and routing of network data through a management network. The node information manager module 824 may be used to manage information regarding nodes in a management network. The network address manager module 826 operates to generate network addresses and derive network addresses of nodes based on information regarding the nodes. The security module 828 is operable to handle authentication and encryption for managing nodes in a management network.

It is appreciated that implementations according to some embodiments that are described with respect to a computer system are merely exemplary and not intended to limit the scope of the embodiments. For example, some embodiments may be implemented on devices such as switches and routers, which may contain application specific integrated circuits (ASICs), field programmable gate arrays (FPGAs), etc. It is appreciated that these devices may include a machine readable medium for storing instructions for implementing methods according flow diagrams 500, 600, and 700.

Figure 9:
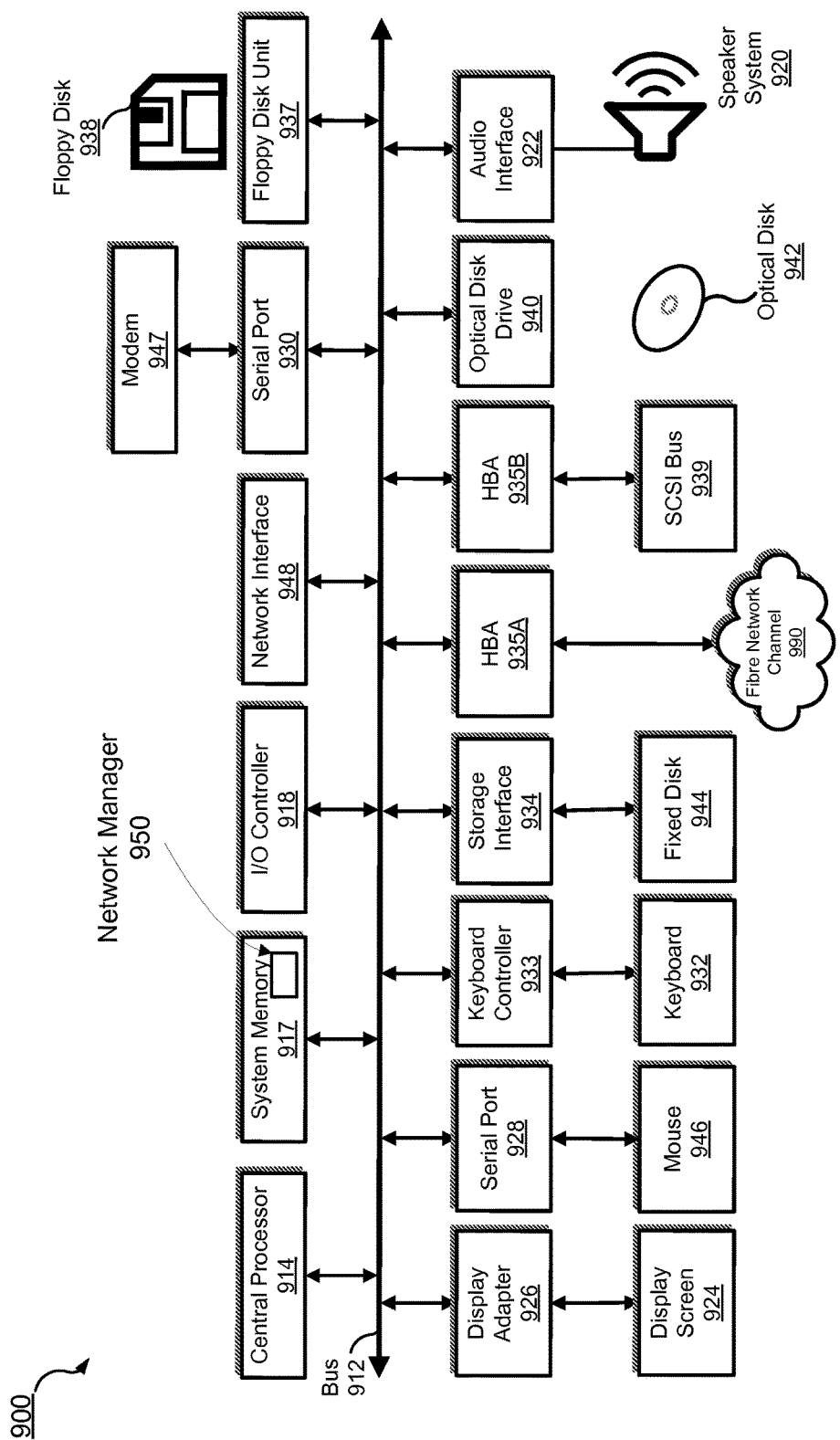
FIG. 9 shows a block diagram of a computer system in accordance with some embodiments.

Referring now to FIG. 9, a block diagram of another computer system in accordance with some embodiments is shown. FIG. 9 depicts a block diagram of a computer system 910 suitable for implementing the present disclosure. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912). It is appreciated that the network interface 948 may include one or more Ethernet ports, wireless local area network (WLAN) interfaces, Bluetooth interfaces, Zigbee interfaces, Z-Wave interfaces, etc., but are not limited thereto. System memory 917 includes a network manager module 950 which is operable to manage nodes in a management network. According to one embodiment, the network manager module 950 may include other modules for carrying out various tasks. For example, the network manager module 950 may include the network switching/routing manager module 822, the node information manager module 824, the network address manager module 826, and the security module 828, as discussed with respect to FIG. 8 above. It is appreciated that the network manager module 950 may be located anywhere in the system and is not limited to the system memory 917. As such, residing of the network manager module 950 within the system memory 917 is merely exemplary and not intended to limit the scope of the embodiments. For example, parts of the network manager module 950 may reside within the central processor 914 and/or the network interface 948 but are not limited thereto.

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a machine readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard machine readable medium for storage and/or retrieval of information, such as a fixed disk drive 944. Fixed disk drive 944 may be a part of computer system 910 or may be separate and accessed through other interface systems. Network interface 948 may provide multiple connections to other devices. Furthermore, modem 947 may provide a direct connection to a remote server via a telephone link or to the Internet via an internet service provider (ISP). Network interface 948 may provide one or more connection to a data network, which may include any number of networked devices. It is appreciated that the connections via the network interface 948 may be via a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code to implement the present disclosure can be stored in machine-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the embodiments disclosed. Many modifications and variations are possible in view of the above teachings.

What is claimed is:

1. A system comprising:
    a first network area comprising a first master node and a first set of switches for forwarding network data through the first network area, wherein the first master node is configured to manage the first set of switches by an input of commands by a user in order to configure and control the first set of switches;

a second network area comprising a second master node and a second set of switches for forwarding network data through the second network area, wherein the second master node is configured to manage the second set of switches;

a third network area comprising a controller configured to manage the first and second sets of switches through the first and second master nodes, wherein the controller inputs control-plane commands executed on the first and second set of switches in the first and second network areas; and at least one additional network area connected to the first network area or the second network area, the at least one additional network area between the controller and the at least one additional network area resulting in a controller distance greater than one, wherein the at least one additional network area comprises an additional master node and an additional set of switches for forwarding network data through the at least one additional network area, and wherein the additional master node is configured to manage the additional set of switches;

wherein the controller is further configured to manage the additional set of switches in the at least one additional network area through the additional master node through the first master node or second master node.

2. The system as described in claim 1, wherein each of the first, second, and third network areas is a separate loop-free broadcast domain.

3. The system as described in claim 1, wherein the first master node, the second master node, and the controller form a layer 3 network, wherein the first master node is further configured to communicate through the layer 3 network with the controller but not with the second master node, wherein the second master node is further configured to communicate through the layer 3 network with the controller but not with the first master node.

4. The system as described in claim 1, wherein the system further comprises a fourth network area comprising a third master node and a third set of switches for forwarding network data through the fourth network area, wherein the third master node is configured to manage the third set of switches, wherein the controller is further configured to manage the third set of switches through the third master node.

5. The system as described in claim 1, wherein the first network area further comprises a first gateway node, wherein the second network area further comprises a second gateway node, wherein the third network area further comprises a third gateway node, wherein the first and third gateway nodes are configured to provide a first communication link for the controller and the first master node to communicate across the first and third network areas, and wherein the second and third gateway nodes are configured to provide a second communication link for the controller and the second master node to communicate across the second and third network areas.

6. The system as described in claim 4, wherein the fourth network area is communicatively coupled to the third network area through the first network area.

7. The system as described in claim 5, wherein the first and second communication links are configured to allow communication of layer 3 network data but not managed layer 2 BPDU network data.

8. The system as described in claim 5, wherein the first gateway node and the first local master node are implemented as a single node on at least one application specific integrated circuit (ASIC).

9. The system as described in claim 5, wherein the third gateway node and the controller are implemented as a single node.

10. A non-transitory machine-readable storage medium having stored thereon, machine executable instructions that, if executed by a networking device, cause the networking device to perform a method comprising:

receiving a first command from a user for managing a first switch in a first network area, wherein the first command is in order to configure and control the first switch;

receiving a second command from the user for managing a second switch in a second network area different from the first network area, wherein the second command is in order to configure and control the second switch;

receiving at least one additional command from the user for managing at least one additional switch in at least one additional network area different from the first network area and the second network area;

based on the first command, directing a first master node in the first network area to manage the first switch;

based on the second command, directing a second master node in the second network area to manage the second switch; and based on the at least one additional command, directing an additional master node in the at least one additional network area to manage the at least one additional switch, wherein the at least one additional network area between the controller and the at least one additional network area results in a controller distance greater than one, and wherein the additional master node is directed through the first master node or the second master node.

11. The non-transitory machine-readable storage medium as described in claim 10, wherein the method further comprises:

receiving a third command from the user for managing a third switch in a third network area different from the first and second network areas; and based on the third command, directing a third master node in the third network area to manage the third switch.

12. The non-transitory machine-readable storage medium as described in claim 10, wherein each of the first and second network areas is a loop-free broadcast domain.

13. The non-transitory machine-readable storage medium as described in claim 10, wherein directing the first master node comprises directing the first master node through a layer 3 network, and wherein directing the second master node comprises directing the second master node through the layer 3 network.

14. A system comprising:
a first network area comprising a first master node and a first set of switches for forwarding network data through the first network area;

a second network area comprising a second master node and a second set of switches for forwarding network data through the second network area;

a third network area comprising a controller node, wherein the first master node and the controller node are configured to exchange respective node information, wherein the second master node and the controller node are configured to exchange respective node information, and wherein the first master node, the second master node, and the controller node are further configured to form a network through which the controller node manages the first and second sets of switches through the first and second master nodes; and at least one additional network area connected to the first network area or the second network area, the at least one additional network area between the controller and the at least one additional network area resulting in a controller distance greater than one wherein the at least one additional network area comprises an additional master node and an additional set of switches for forwarding network data through the at least one additional network area, and wherein the additional master node is configured to manage the additional set of switches;

wherein the controller node is further configured to manage the additional set of switches in the at least one additional network area through the additional master node through the first master node or second master node, wherein the controller node inputs control-plane commands executed on the first and second set of switches in the first and second network areas.

15. The system as described in claim 14, wherein the network is a layer 3 network.

16. The system as described in claim 15, wherein the first master node, the second master node, and the controller node are further configured to generate layer 3 routes based on the exchanged node information to enable management traffic.

17. The system as described in claim 15, wherein each of the first master node, the second master node, and the controller node has a layer 3 network address determined based on its own respective node information.

18. The system as described in claim 14, wherein the node information is exchanged over physical Ethernet links.

19. The system as described in claim 14, wherein the node information is exchanged over tunneled virtual links.

20. The system as described in claim 17, wherein each of the first master node, the second master node, and the controller node is further configured to derive the layer 3 network address of another node based on the node information of the another node and without access to a MAC address of the another node.

* * * * *